(12) United States Patent
Shi

(10) Patent No.: US 9,438,575 B2
(45) Date of Patent: Sep. 6, 2016

(54) SMART PHONE LOGIN USING QR CODE

(71) Applicant: PAYPAL, INC., San Jose, CA (US)

(72) Inventor: Jiazheng Shi, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 282 days.

(21) Appl. No.: 13/713,219

(22) Filed: Dec. 13, 2012

(65) Prior Publication Data
US 2013/0167208 A1    Jun. 27, 2013

Related U.S. Application Data

(60) Provisional application No. 61/579,489, filed on Dec. 22, 2011.

(51) Int. Cl.
*H04L 29/06* (2006.01)
*H04W 12/06* (2009.01)

(52) U.S. Cl.
CPC ............ *H04L 63/08* (2013.01); *H04L 63/18* (2013.01); *H04W 12/06* (2013.01)

(58) Field of Classification Search
CPC ....... H04L 63/08; H04L 63/18; H04W 12/06
USPC ........................................................... 726/5
See application file for complete search history.

(56) References Cited

U.S. PATENT DOCUMENTS

| 7,606,918 | B2* | 10/2009 | Holzman et al. ............. 709/229 |
| 7,979,899 | B2* | 7/2011 | Guo et al. .......................... 726/7 |
| 8,856,902 | B2* | 10/2014 | Payne ..................... G06F 21/35 726/3 |
| 2009/0264070 | A1* | 10/2009 | Lim ............................. 455/41.2 |
| 2009/0298470 | A1* | 12/2009 | Huber et al. ................. 455/411 |
| 2009/0307232 | A1* | 12/2009 | Hall ............................... 707/10 |
| 2010/0070759 | A1* | 3/2010 | Leon Cobos et al. ........ 713/155 |
| 2011/0219427 | A1* | 9/2011 | Hito ........................ G06F 21/00 726/3 |
| 2012/0091204 | A1 | 4/2012 | Shi |
| 2013/0086650 | A1* | 4/2013 | Soundrapandian et al. ...... 726/5 |
| 2013/0111208 | A1* | 5/2013 | Sabin et al. .................. 713/171 |

* cited by examiner

*Primary Examiner* — John B King
(74) *Attorney, Agent, or Firm* — Hayes and Boone, LLP

(57) ABSTRACT

Systems and methods are disclosed for a user to use a mobile device such as a smart phone to scan a QR (Quick Response) code displayed on a login webpage of a website. The QR code may encode a server URL of the website. The mobile device decodes the QR code and transmits a device ID and other decoded information to a service provider. The service provider locates login credentials of the user linked to the device ID and communicates the login credentials to a website server for user authentication. Alternatively, the mobile device may transmit its device ID to the website server for the website server to locate a user account linked to the device ID for user login. Alternatively, the mobile device may transmit stored login credentials to the website server. Advantageously, a user may access a website without the need to provide any login credentials.

14 Claims, 5 Drawing Sheets

SMART PHONE LOGIN USING QR CODE

CROSS-REFERENCE TO RELATED APPLICATIONS

This application claims priority to and benefit of U.S. Provisional Patent Application Ser. No. 61/579,489, filed on Dec. 22, 2011. The content of the provisional application is hereby incorporated by reference in its entirety.

TECHNICAL FIELD

The present disclosure relates generally to systems and methods for authenticating users over a computer network. In particular, the present disclosure relates to methods and systems for efficiently and securely using capabilities of mobile devices to facilitate user logins to webpages.

BACKGROUND

Creating and remembering a user name and password for login is often challenging, especially when the user has different user names and/or passwords for different sites. When a user cannot remember the user name and/or password when attempting to login to a site, the user may abandon a login session or may contact customer support for recovery of the login credentials. As a result, companies may encounter reduced login volume or may have to expend resources managing user accounts. Often, for ease of remembering the login credentials, a user may use the same user name and password for all or most of the user's sites. This is not secure, as a fraudster who obtains the login credentials for one site can then access all the other sites using the same credentials.

Even if the user easily remembers a user name and password, the user still has to manually enter the information, such as through a keyboard or keypad. This makes the login credentials susceptible to detection by keylogger spyware or people looking over the user's shoulder, especially when the user is in a public place or attempting to login through a public computer. While systems have been proposed to more securely authenticate users, these systems may require special hardware such as biometrics readers or near field communication (NFC) devices. Accordingly, it is desirable to provide ways for users to login to websites conveniently, securely, and efficiently.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
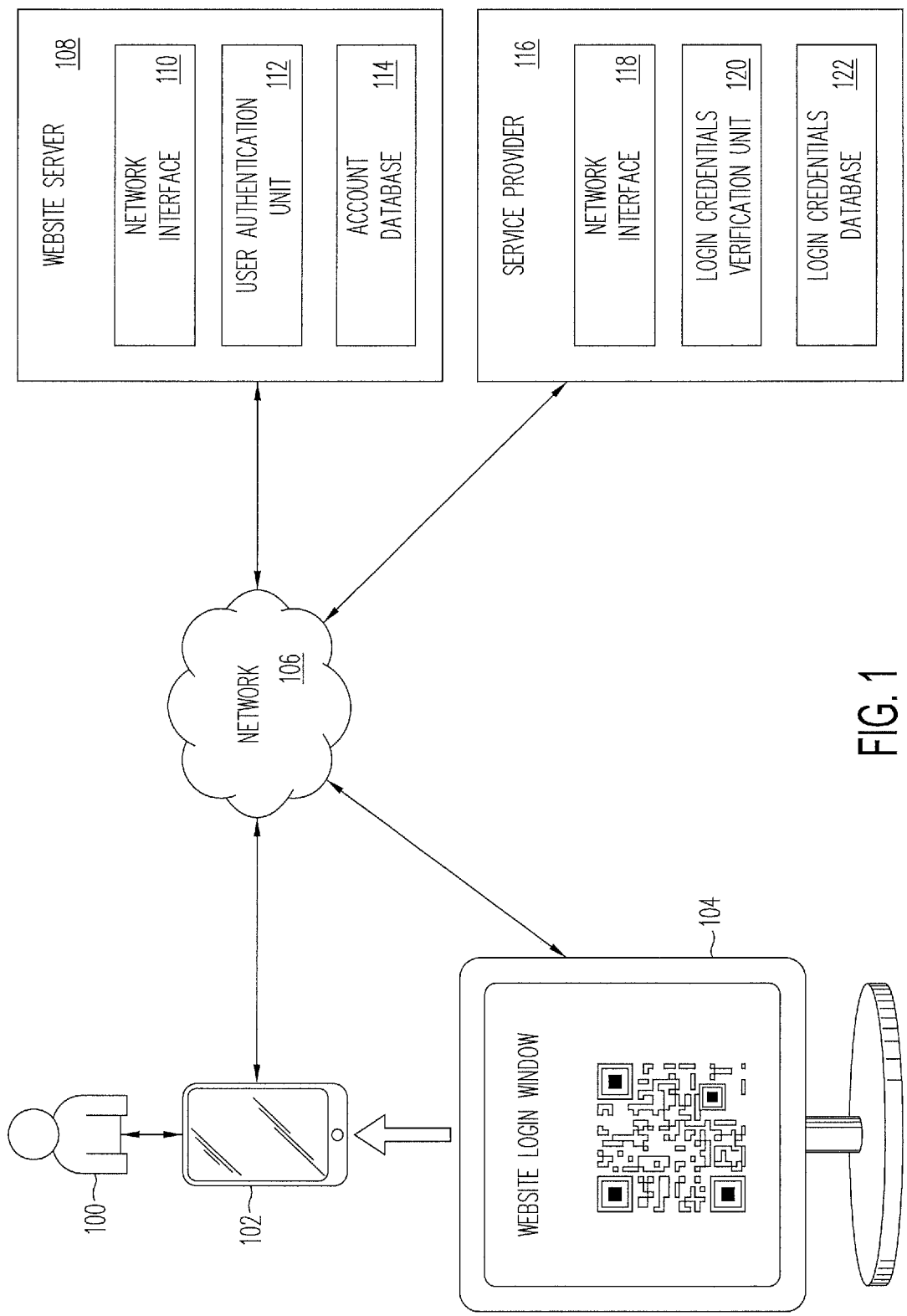
FIG. 1 shows a system for a user to use a mobile device to scan QR code displayed on a login window to supply identification information to a website for the website to authenticate the user according to one or more embodiments of the present disclosure.

Systems and methods are disclosed herein for a user to use a mobile device such as a smart phone to scan a QR (Quick Response) code displayed on a login webpage of a website. The mobile device supplies identification information of the mobile device to a server of the website. The server locates login credentials linked to the device identification information to enable the user to login to the website without having to manually enter login credentials. The mobile device may also supply identification information of the mobile device to a service provider that stores multiple login credentials of the user for multiple sites. The service provider locates login credentials of the user linked to the device identification information for a website identified by the mobile device. The service provider communicates the login credentials of the user to a server of the website for the server to authenticate the user.

The login webpage of the website may display a randomly generated 2D QR code alongside a login box. The QR code may encode a server URL (Uniform Resource Locator) for the website, and other information such as a session ID. The user scans the QR code with the mobile device. The mobile device decodes the QR code to obtain the server URL and other information encoded in the QR code. The mobile device may transmit a device ID of the mobile device and other information such as the location information of the mobile device to the server URL. The server verifies that there are login credentials linked to the device ID. The server grants the user access to the website based on the linked login credentials and may perform further authentication using information received from the mobile device. If login credentials are not linked to the device ID (such as when the user is attempting to login to the website through the QR code for the first time), the server may request the user to provide the login credentials for linking with the device ID. The user may supply the login credentials from the mobile device. The website may verify that the received login credentials match login credentials the server has on file for the user and may link the mobile device to the login credentials. Subsequently, the user may login to the website by simply providing the device ID from the mobile device. In one or more embodiments, the mobile device may securely store the login credentials of the user (e.g., a username, password, PIN, or other user authentication information) for the website. After scanning the QR code, the mobile device may supply the login credentials for the website instead of the device ID to the website. The website may authenticate the user in the usual manner without the need to store the device identification information.

Advantageously, the user may access a website even if the user forgets the login credentials for the site. Security is enhanced because the user is not required to enter login credentials that may be stolen, seen, or copied. The QR code itself also does not need to contain any user account information. The QR code may be a transient bridge connecting the mobile device and the website server. Thus, interception of the QR code does not expose login credentials or compromise login security. Scanning a QR code is also easier and faster than typing in user names and passwords, especially longer user names and passwords. Scanning is preferred by many users who cannot type due to disability and who do not like typing like seniors.

In accordance with one or more embodiments of the present disclosure, an apparatus is disclosed. The apparatus includes a network interface that communicates with devices over a network. The apparatus also includes a memory that stores machine-readable instructions. The apparatus further includes one or more processors that execute the machine-readable instructions to receive a login request for a user from a user device. The login request is received from a scan by the user device of a code displayed on a login page of a website. The processors also identify from the login request a user account associated with the website. The processors further cause the user to be granted access to the website.

In accordance with one or more embodiments of the present disclosure, a method is disclosed. The method includes receiving by a processor of a server a login request for a user from a user device. The login request is received from a scan by the user device of a code displayed on a login page of a website. The method further includes identifying from the login request a user account associated with the website. The method further includes granting the user access to the website.

In accordance with one or more embodiments of the present disclosure, a non-transitory computer readable medium having computer readable code for execution by a processor of a server to perform a method is disclosed. The method includes receiving a login request for a user from a user device. The login request is received from a scan by the user device of a code displayed on a login page of a website. The method further includes identifying from the login request a user account associated with the website. The method further includes causing the user to be granted access to the website.

Refer now to the figures wherein the drawings are for purposes of illustrating embodiments of the present disclosure only, and not for purposes of limiting the same. FIG. 1 shows a system for a user to use a mobile device to scan QR code displayed on a login window to supply identification information to a website for the website to authenticate the user according to one or more embodiments of the present disclosure.

A user 100 carries a mobile device 102. Mobile device 102 may be a smart phone (e.g., iPhone, Google phone, or other phones running Android, Window Mobile, or other operating systems), a tablet computer (e.g., iPad, Galaxy), personal digital assistant (PDA), a notebook computer, or various other types of wireless or wired computing devices. It should be appreciated that mobile device 102 may be referred to as a client device or a customer device without departing from the scope of the present disclosure. Mobile device may have a camera. Mobile device 102 may communicate over a network 106 with a service provider 116 or with a website server 108. In one embodiment, service provider 116 may act as an intermediary between mobile device 102 and website server 108 to facilitate user authentication by website server 108.

Network 106 may be implemented as a single network or a combination of multiple networks. For example, in various embodiments, network 106 may include the Internet and/or one or more intranets, wireless networks (e.g., cellular, wide area network (WAN), WiFi hot spot, WiMax, personal area network (PAN), Bluetooth, etc.), landline networks and/or other appropriate types of communication networks. As such, in various embodiments, mobile device 102 may be associated with a particular link (e.g., a link, such as a URL (Uniform Resource Locator) to an IP (Internet Protocol) address).

In one or more embodiments, user 100 is at a PC 104 and wishes to access a website running on website server 108. User 100 may enter a URL address of the website or may click on a link to the website. Website server 108 displays a login window of a webpage on a screen of PC 104 requesting the user to provide login credentials such as a user name and a password. The login webpage also displays a 2D QR code. The QR code may encode a URL of website server 108 and other information presented by the website server 108, such as a merchant ID, a session ID, a transaction ID, etc. While the exemplary embodiments described herein shows QR code on a login webpage displayed on a screen of PC 104, other symbols or data encoding schemes, such as UPC code, may also be displayed. Similarly, the login webpage may be displayed on a TV, kiosk, tablet computer, notebook computer, mobile device, or other types of screen terminals or display medium. Furthermore, the information encoded may be used to facilitate other types of human machine interface, not just for logging into a website. User 100 uses the camera on mobile device 102 to scan the QR code of the login webpage displayed on the screen of PC 104. User 100 may scan the QR code by opening a mobile app of the website or of service provider 116 to activate the camera. Mobile device 102 may contain QR code reading software to capture and decode the captured QR code. The decoded URL and other decoded information such as the session ID, merchant ID, transaction ID, etc. may be received by the mobile app. The mobile app may inform mobile device 102 that login credentials are requested.

Mobile device 102 may transmit an encrypted device ID, the session ID, and other decoded information to the URL of website server 108 through network 106 if the mobile app used to scan the QR code is from the website running on website server 108. Alternatively, mobile device 102 may transmit the encrypted device ID, the URL of the website hosted on website server 108, the merchant ID, and other decoded information to the service provider 116 through network 106 if the mobile app is from the service provider 116. Website server 108 may have a network interface 110 that interfaces with network 106 to receive the device ID of mobile device 102. Website server 108 may invoke a user authentication unit 112 to verify if the device ID is linked to a user account. An account has been linked to the device ID if user 100 has previously logged into the website by scanning the QR code using mobile device 102 or if user 100 has otherwise logged into the website from mobile device 102. If an account is linked with the device ID, website server 108 may retrieve account information linked to the device ID, including user login credentials, from an account database 114. Website server 108 may grant user 100 access to the website and may present a screen on mobile device 102 confirming that user 100 is logged in to the website.

If the device ID is not linked with a user account, then user 100 may be attempting to login to website server 108 using the scanned QR code from mobile device 102 for the first time. Website server 108 may request user 100 to provide login credentials from the mobile device 102 by presenting a login screen on mobile device 102. User 100 may enter a user name and password (or other information as required by website server 108), such as an e-mail address and a PIN for the login credentials. User 100 may enter the requested information on mobile device 102 through a keyboard, keypad, touchscreen, or voice command. Mobile device 102 transmits the login credentials to website server 108, where user authentication unit 112 processes the login credentials in the same way it would if user 100 entered the login credentials manually through a login window. If the login credentials provided by user 100 match the login credentials website server 108 has in account database 114, user 100 is authenticated. Website server 108 may link the device ID to the login credentials and grants user 100 access to the website. Website server 108 may present a screen on mobile device 102 confirming that user 100 is logged in and that the device ID has been linked to the login credentials. If the login credentials provided by user 100 do not match the login credentials website server 108 has in account database 114, website server 108 may request user 100 to re-enter the login credentials until user 100 is successfully authenticated or until a threshold number of unsuccessful login attempts is reached. Alternatively, if user 100 does not have an established account with website server 108, user 100 may be requested to register as a new account holder using the provided login credentials.

In one embodiment, mobile device 102 may store the login credentials. For example, the mobile app for the website may store the login credentials of user 100 for the website. The stored login credentials may be provided as a convenience to user 100 if user 100 needs to be reminded of the login credentials when attempting to login to website server 108 from another device. Mobile device 102 may also transmit the stored login credentials to website server 108 or service provider 116 to request user access to the website without relying on the device ID. Thus, website server 108 may not need to store device IDs or to link a device ID to the login credentials of user 100, allowing authentication of user 100 to be performed in the usual manner.

In one embodiment, service provider 116 may act as an intermediary between mobile device 102 and website server 108. Service provider 116 may store the login credentials linked to the device ID for a multitude of website in a login credentials database 122. User 100 who wishes to login to a website may open a mobile app of service provider 116 to scan the QR code displayed on a login webpage of the website. As before, code reading software on mobile device 102 may capture and decode the QR code to yield the URL of the website and other decoded information. Mobile device 102 may transmit an encrypted device ID, the URL of the website, a session ID, and other decoded information to service provider 116 through network 106. Service provider 116 may have a network interface 118 that interfaces with network 106 to receive the transmission from mobile device 102. Service provider 116 may invoke a login credentials verification unit 120 to verify if the received device ID is linked to an account of the website identified by the received URL. If an account for the website is linked with the device ID, service provider 116 may retrieve the login credentials of the account from login credentials database 122. Service provider 116 may transmit the login credentials to the URL of website server 108 for authentication. Website server 108 may invoke user authentication unit 112 to authenticate the login credentials. After user 100 is authenticated, website server 108 may grant user 100 access to the website and may present a login confirmation screen on mobile device 102.

If the received ID is not linked with an account of the website identified by the URL, user 100 is attempting to login to the website using the scanned QR code from mobile device 102 for the first time. Service provider 116 may request user 100 to provide login credentials from mobile device 102 by presenting a login screen on mobile device 102. As when website server 108 requests user 100 to provide login credentials for linking with the device ID, user 100 may enter a user name and password on mobile device 102 for the login credentials. Mobile device 102 transmits the login credentials to service provider 116, which may store the login credentials as account information for the website. Service provider 116 may link the device ID to the login credentials for the website identified by the URL. Service provider 116 may transmit the login credentials to the URL of website server 108 for authentication through network 106. If authentication is successful, website server 108 may grant user 100 access to the website. Website server 108 may, directly or through service provider 116, present a screen on mobile device 102 confirming that user 100 is logged in and that the device ID has been linked to the login credentials.

If the login credentials cannot be authenticated, website server 108, directly or through service provider 116, may request user 100 to re-enter the login credentials. When user 100 re-enters the login credentials, service provider 116 may store the login credentials, link the login credentials to the device ID, and transmit the login credentials to website server 108 for authentication. If the user 100 has not established account with the website identified by the URL, user 100 may be requested to register as a new account holder using the provided login credentials. In one embodiment, the mobile app for the service provider 116 may store the login credentials on mobile device 109 if user 100 ever needs to be reminded of the login credentials for the website.

Figure 2:
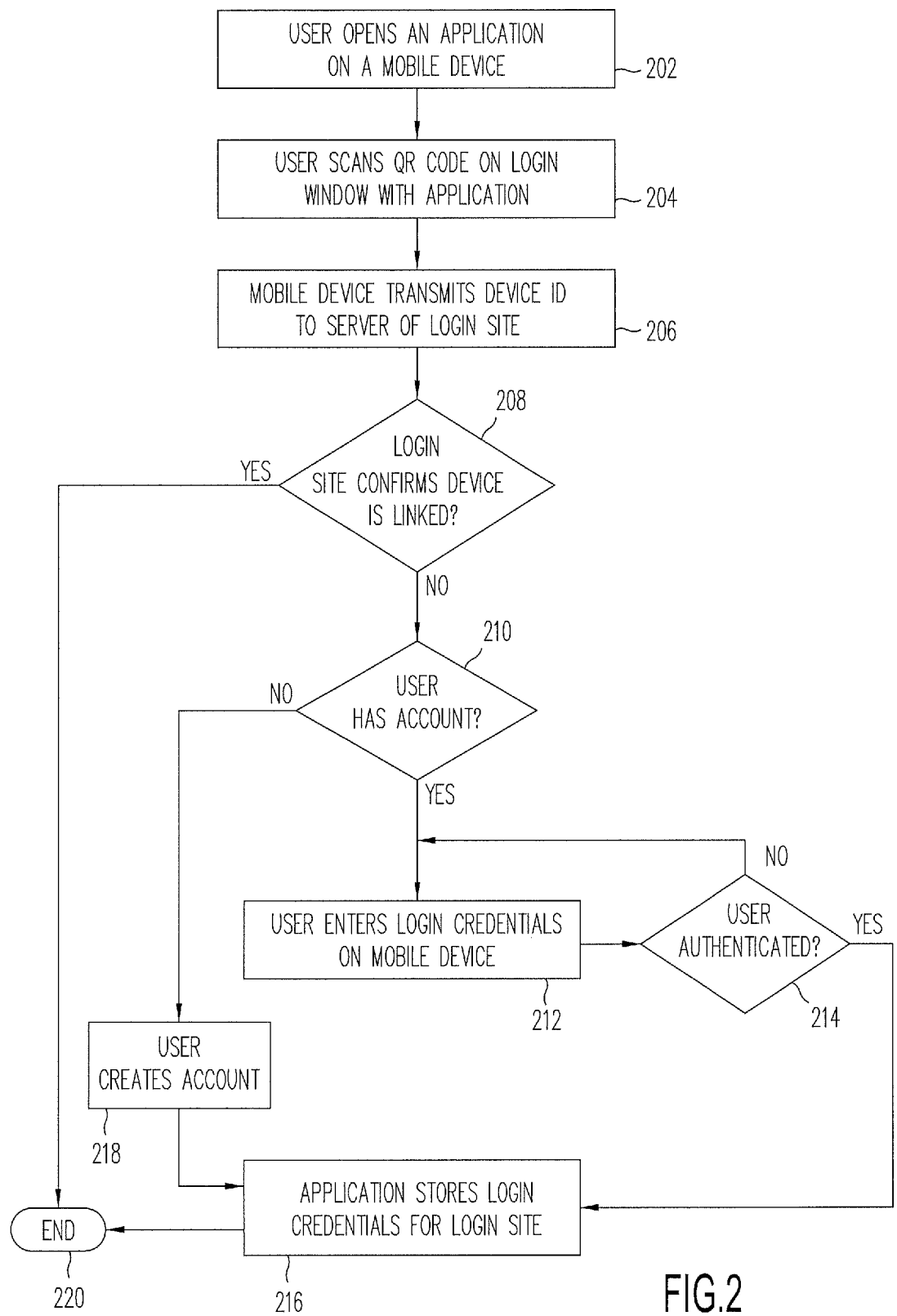
FIG. 2 shows a flow chart of the steps for a user to use a mobile device to scan QR code displayed on a login window of a website and to supply device ID of the mobile device to the website for the website to link the device ID to login credentials of the user according to one or more embodiments of the present disclosure.

FIG. 2 shows a flow chart of the steps for a user to use a mobile device to scan QR code displayed on a login window of a website and to supply device ID of the mobile device to the website server of FIG. 1 for the website server to link the device ID to login credentials of the user according to one or more embodiments of the present disclosure. In step 202, user 100 opens an application, such as a mobile app of website server 108 on mobile device 102. The application may direct user 100 to scan a QR code displayed on the login webpage of a website hosted on website server 108. The login webpage may be displayed on a screen of a PC 104. In step 204, user 100 uses a camera on mobile device 102 to capture the QR code. The QR code may encode a URL of the website and other information such as a merchant ID, a randomly generated session ID, a transaction ID, etc. Code reading software may decode the QR code for the application. The application may inform mobile device 102 that login credentials to the website URL are requested.

In step 206, mobile device 102 transmits an encrypted device ID of mobile device 102 to website server 108 designated by the decoded URL. Mobile device 102 may also transmit to website server 108 information decoded from the QR code, such as the session ID, and/or information generated by mobile device 102, such as its GPS location. Website server 108 receives the transmission and determines if the device ID is linked to a user account. An account may be linked to the device ID if user 100 has previously logged into the website from mobile device 102 using the QR code or through other ways. If an account is linked to the device ID, website server 108 may login the user and may retrieve information on the user account. Website server 108 may transmit a login confirmation page to mobile device 102. In step 208, mobile device 102 determines if the login confirmation page is received. If it is, user may proceed to access the website in step 220.

In one embodiment, mobile device 102 may have stored the login credentials for the website URL when user 101 previously entered the login credentials into mobile device 102. When the application informs mobile device 102 that login credentials to the website URL are requested, mobile device 102 may determine that it has the login credentials. In step 206, mobile device 102 may transmit the login credentials to website server 108 in place of, or in addition to, the encrypted device ID of mobile device 102. Website server 108 may authenticate user 100 using the received login credentials and may generate a login confirmation page to mobile device 102 when user 100 is granted access to the website. Thus, the determination of whether the device ID is linked to a user account may be made at mobile device 102 as well at website server 108.

If website server 108 determines that the device ID is not linked to a user account, website server 108 presents a login screen on mobile device 102 requesting user 100 to provide login credentials. The login screen may also allow user 100 to create an account if user 100 does not have an account with website server 108. In step 210, a decision is made on whether user 100 has an account with website server 108. If user 100 has an account, user 100 enters the login credentials into mobile device 102 in step 212. User 100 may enter a user name and a password using a keyboard, keypad, touchscreen, voice command, or through other methods of user input. Mobile device 102 may transmit the login credentials to website server 108 for authentication of user 100. If website server 108 is able to authenticate user 100 with the login credentials, website server 108 may link the device ID to the login credentials so that user 100 may initiate future login requests from mobile device 102 by transmitting the device ID. Website server 108 may generate a login confirmation page to mobile device 102 to grant user 100 access to the website. In step 214, mobile device 102 determines if the login confirmation page is received. If it is, user authentication is successful and the application stores the login credentials for the website URL in step 216. User 100 may proceed to access the website. In one embodiment, the application may not store the login credentials. If website server 108 cannot authenticate user 100 because the login credentials are wrong, mobile device 102 does not receive the login confirmation page from website server 108 in step 214. User may be requested to re-enter the login credentials until user 100 is authenticated or until a threshold number of unsuccessful login attempts is reached.

If user 100 does not have an account with website server 108, user 100 would need to create an account. In step 218, user 100 creates an account by entering a user name, password, and other information requested on the login screen into mobile device 102. Again, user 100 may enter the information using a keyboard, keypad, touchscreen, voice command, or through other methods of user input. Website server 108 may store the received account information, link the device ID to the login credentials, and generate a new account confirmation page to mobile device 102. In step 216, when mobile device receives the new account confirmation page, the application stores the login credentials for the website URL. User 100 may proceed to access the website. In one embodiment, the application may not store the login credentials. Thus, user 100 may login to website server 108 by using the device ID of mobile device 102 that is linked to a user account, by entering the login credentials of an established account for linking with the device ID, or by creating login credentials for a new account for linking with the device ID.

Figure 3:
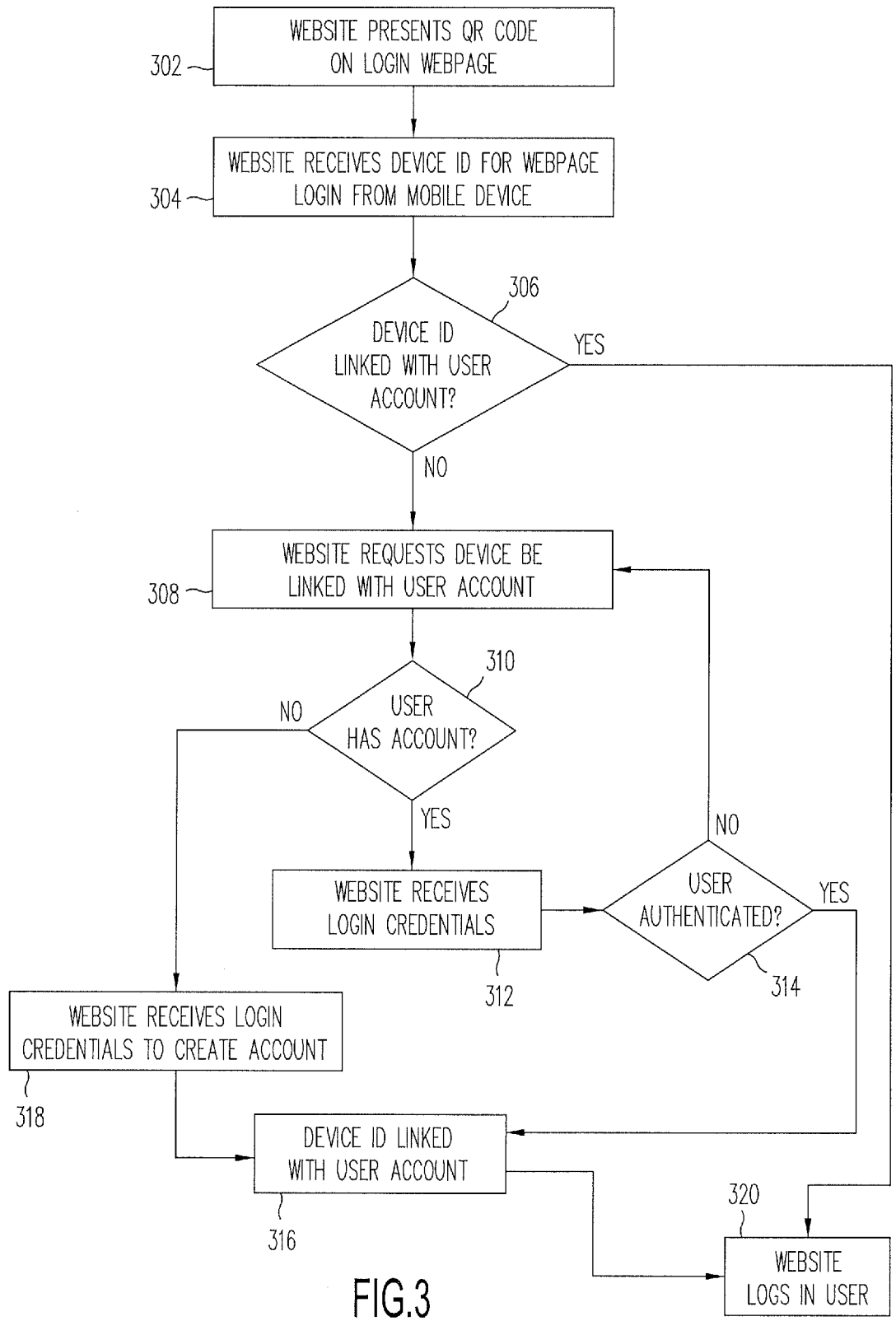
FIG. 3 shows a flow chart of the steps for a website server to receive device ID of a mobile device that has scanned QR code displayed on a login window of a website for the website server to link login credentials of a user to the mobile device according to one or more embodiments of the present disclosure.

FIG. 3 shows a flow chart of the steps for a website server to receive device ID of a mobile device that has scanned QR code displayed on a login window of a website of FIG. 1 for the website server to link login credentials of a user to the mobile device according to one or more embodiments of the present disclosure. In step 302, website server 108 presents QR code on a login webpage of the website hosted on website server 108. The login webpage may be displayed on a screen of a PC 104 or other types of terminals. The QR code may encode a URL of the website and other information such as a merchant ID, a randomly generated session ID, a transaction ID, etc. User 100 uses a camera on mobile device 102 to capture the QR code and invokes code reading software to decode the QR code to obtain the website URL and other information.

In step 304, website server 108 receives an encrypted ID of mobile device 102 from mobile device 102. Website server 108 may also receive from mobile device 102 information decoded from the QR code, such as a session ID, and/or information on the mobile device 102, such as its GPS location. In step 306, website server 206 determines if the received device ID is linked to a user account. If it is, website server 108 may retrieve account information of the user account. In step 320, website server 108 logins user 100 to grant user 100 access to the website. Website 108 may transmit a login confirmation page to mobile device 102.

If website server 108 determines that the device ID is not linked to any user account, website server presents a login screen on mobile device 102 requesting user 100 to provide login credentials in step 308. The login screen may also request user 100 to create an account if user 100 does not have an account with the website. In step 310, user 100 decides if user 100 has an account with the website. If user 100 has an account, user may enter the login credentials, such as a user name and a password, into mobile device 102. In step 312, website server 108 receives the login credentials from mobile device 102. In step 314, website server 108 attempts to login user 100 using the received login credentials. If website server 108 is able to authenticate user 100 using the login credentials, in step 316 website server 108 links the device ID to the login credentials so that user 100 may be logged into the website in the future by transmitting the device ID from mobile device 102. In step 320, website server 108 logins user 100 into the website. Website 108 may transmit a login confirmation page to mobile device 102. If website server 108 is not able to authenticate user 100 using the received login credentials, website server 108 may display a message on the login screen of mobile device 102 informing user 100 that the login credentials are wrong. User 100 may re-enter the login credentials until user 100 is authenticated or until a threshold number of unsuccessful login attempts is reached.

If user does not have an account, user 100 may select an option on the login screen to create a new account. User 100 may create login credentials such as a user name, password, and may enter other information into mobile device 102. In step 318, website server 108 receives the login credentials from mobile device 102 to create a new account for user 100. In step 316, website server 108 links the device ID to the login credentials for the new account. In step 320, website server 108 logins user 100 into the website. Website 108 may transmit a new account confirmation page to mobile device 102 informing user 100 that a user account has been created for the website and that the login credentials have been linked to the device ID of mobile device 102. Thus, website server 108 may authenticate user 100 by using the device ID of mobile device 102 that is linked to a user account, by receiving login credentials of an established account to link with the device ID, or by receiving login credentials for a new account to link with the device ID.

Figure 4:
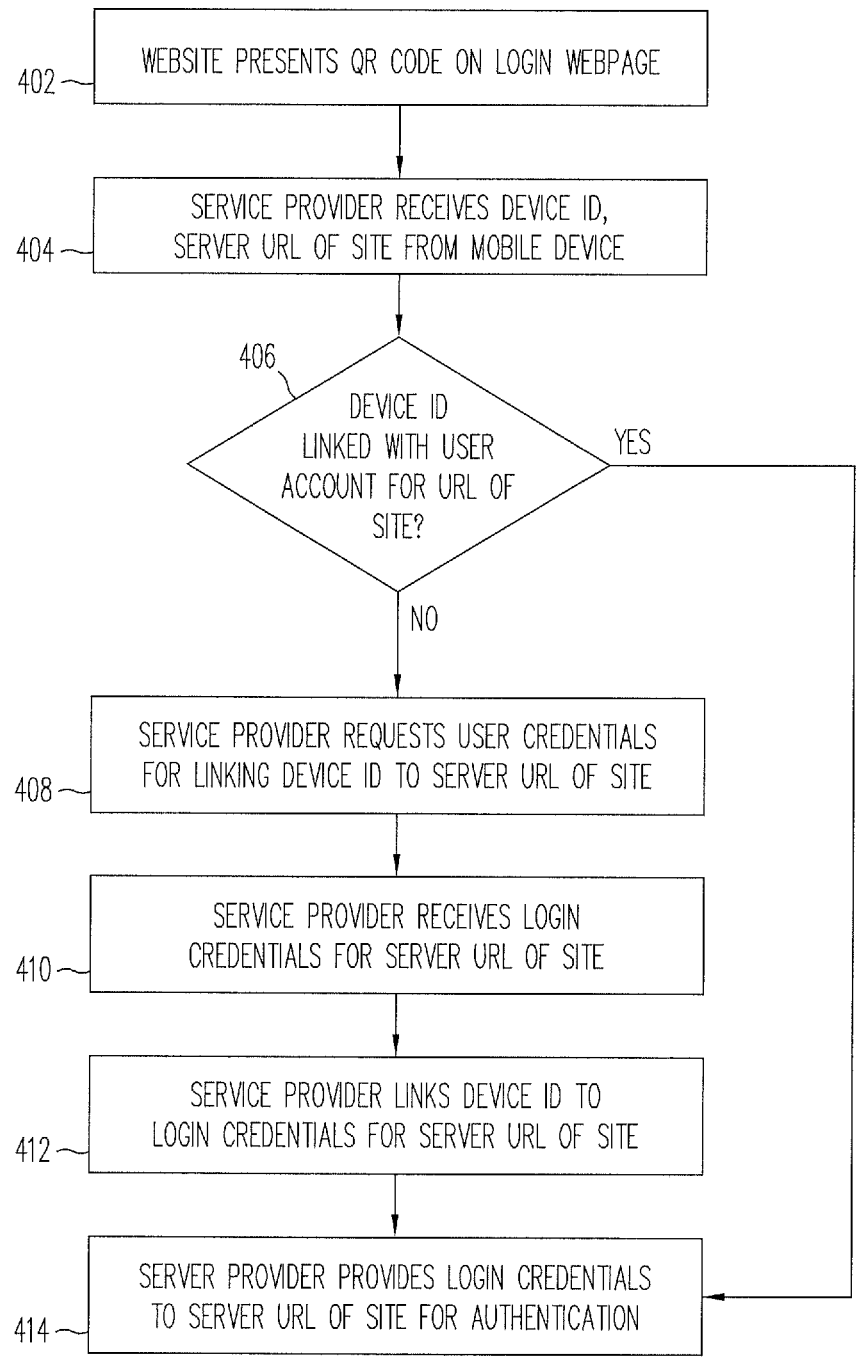
FIG. 4 shows a flow chart of the steps for a service provider to receive device ID of a mobile device that has scanned QR code displayed on a login window of a website for the service provider to link login credentials of a user to the device ID and to supply the login credentials to the website according to one or more embodiments of the present disclosure.

FIG. 4 shows a flow chart of the steps for a service provider to receive device ID of a mobile device that has scanned QR code displayed on a login window of a website of FIG. 1 for the service provider to link login credentials of a user to the device ID and to supply the login credentials to the website according to one or more embodiments of the present disclosure. Service provider 116 may act as an intermediary between mobile device 102 and a multitude of websites by storing the login credentials linked to mobile device 102 for the websites. In step 402, website server 108 presents, on a screen of a PC 104, QR code of a login window of a website hosted on website server 108. User 100 uses a camera on mobile device 102 to capture the QR code. Mobile device 102 may invoke code reading software to decode the QR code to obtain the website URL and other information encoded by the QR code.

In step 404, service provider 116 receives from mobile device 102 an encrypted device ID of mobile device 102, the website URL, and other decoded information such as a session ID from mobile device 102. In step 406, service provider 116 determines if the received device ID is linked with a user account for the website URL. If it is, service provider 116 retrieves the login credentials of the user account and transmits the login credentials to website server 108 for authentication in step 414. If website server 108 is able to authenticate user 100 using the login credentials, website server 108 may transmit a login confirmation page to mobile device 102. In one embodiment, website server 108 may request service provider 116 to transmit a login confirmation page to mobile device 102.

If the received device ID is not linked with an account for the website URL, service provider 116 presents a login screen on mobile device 102 requesting user 100 to provide login credentials for the website in step 408. The login screen may also request user 100 to create an account if user 100 does not have an account with the website. If user 100 has an account with the website, user 100 may enter login credentials such as a user name and password into mobile device 102. In step 410, service provider 116 receives the login credentials from mobile device 102. In step 412, service provider 116 links the device ID to the login credentials for the website. In step 414, service provider 116 transmits the login credentials to website server 108 for authentication. If authentication is successful, service provider 116 may transmit a login confirmation page to mobile device 102 confirming that user 100 is logged in and that the device ID has been linked to the login credentials. If authentication fails, service provider 116 may display a message on the login screen of mobile device 102 informing user 100 that the login credentials are wrong. User 100 may re-enter the login credential. Service provider 116 may receive the new login credentials from mobile device 102, link the device ID to the new login credentials, and transmit the new login credentials to website server 108 for authentication. In one embodiment, user 100 may be prevented from logging in if service provider 116 detects a threshold number of unsuccessful login attempts from mobile device 102.

In one or more embodiments, if user does not have an account with the website, user 100 may select an option on the login screen to create a new account. User 100 may create login credentials and may enter other information required for creating a new account into mobile device 102. Service provider 116 may receive the login credentials and may link the device ID to the new login credentials. Service 116 may transmit the login credentials and the other new account information to website server 108 for website server 108 to create a new account for user 100. After the new user account is created by website server 108, service provider 116 may transmit a new account confirmation page to mobile device 102 informing user 100 that a user account has been created for the website, that the device ID has been linked to the login credentials, and that user 100 has been granted access to the website.

Figure 5:
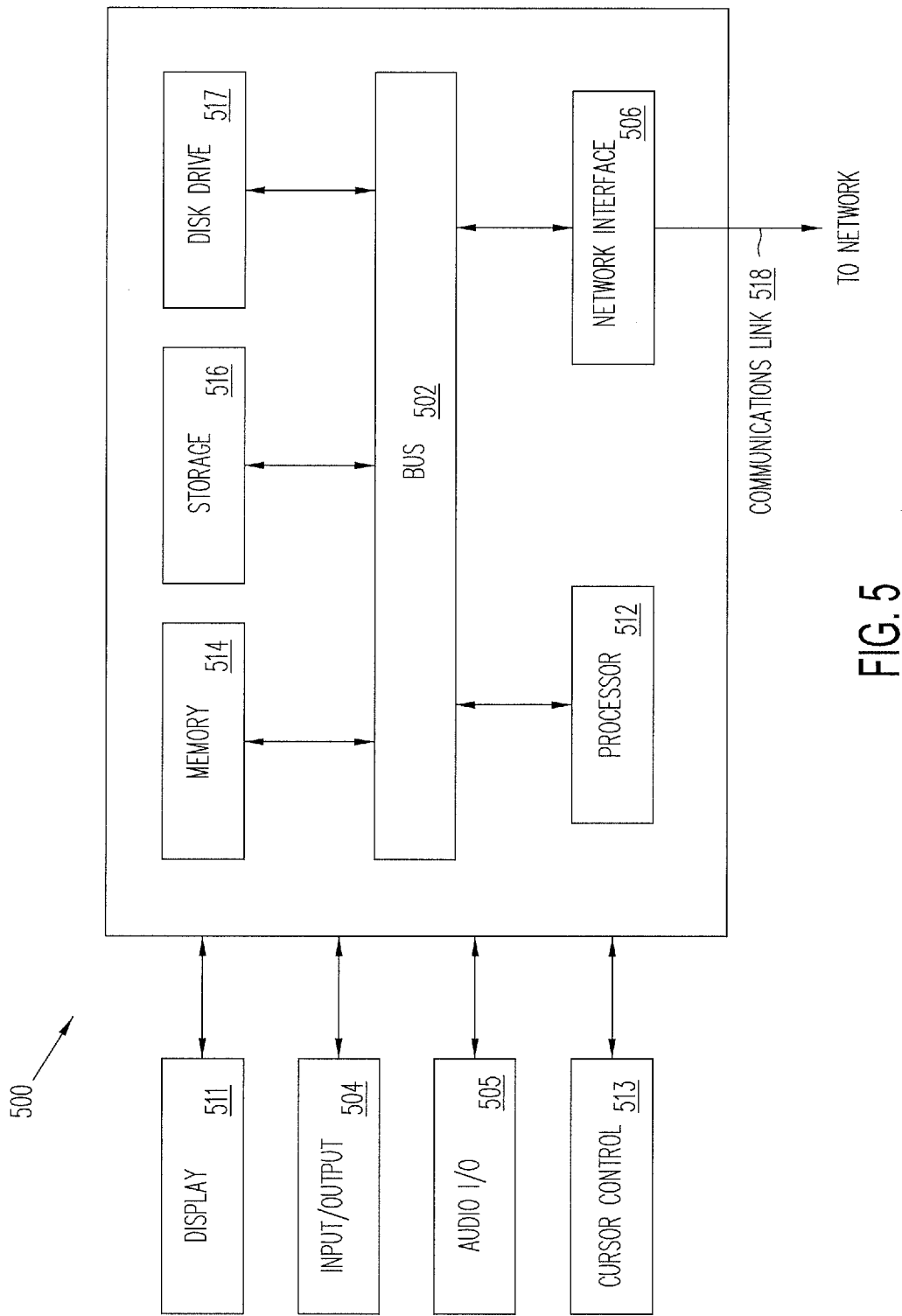
FIG. 5 is a block diagram of a computer system suitable for implementing one or more components discussed herein according to one embodiment of the present disclosure.

FIG. 5 is a block diagram of a computer system 500 suitable for implementing one or more embodiments of the present disclosure. In various implementations, the mobile device of the user may comprise a personal computing device (e.g., smart phone, a computing tablet, a personal computer, laptop, PDA, Bluetooth device, key FOB, badge, etc.) capable of communicating with the network. The website server or the service provider may utilize a network computing device (e.g., a network server) capable of communicating with the network. It should also be appreciated that the mobile app on the mobile device, the process to verify that device ID of a mobile device is linked with a user account, or other user authentication process may be implemented as applications running on computer system 500.

Network computing device may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 5 may be deployed in other ways and that the operations performed and/or the services provided by such servers may be combined or separated for a given implementation and may be performed by a greater number or fewer number of servers. One or more servers may be operated and/or maintained by the same or different entities.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices, such as another user device, a seller server, or a payment provider server via a communication link 518 to a network. In one embodiment, the transmission is wireless, although other transmission mediums and methods may also be suitable. A processor 512, which can be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Application software in accordance with the present disclosure, such as computer programs executed by a processor of the service provider or the website server to link device ID of a mobile device to a user account, or the mobile app executed by the mobile device to receive the decoded QR code, may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, even though QR code is a mature technology with large information storage capacity, other code, symbols, text, objects that may be recognized quickly and accurately by mobile devices may be used to convey the information for the login webpage. For example, UPC code can be used to encode the server URL and a transient session number, which then can be scanned by the mobile device to connect the mobile device with the website server to accomplish the novel login process as discussed herein. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

I claim:

1. A system for a service provider comprising:
a network interface configured to communicate with devices over a network;
a non-transitory memory configured to store a plurality of machine-readable instructions; and
one or more hardware processors coupled to the non-transitory memory and configured to read instructions from the non-transitory memory to cause the system to perform operations comprising:
receiving a login request from a user through a user device comprising at least a device identifier (ID) and a user name for an account, wherein the login request is received from a scan of a code on a login page of a website using a camera of the user device, wherein the user device executes a mobile application to scan the code using the camera, and wherein the mobile application captures and decodes the code to transmit the login request with the device ID encrypted by the mobile application;
decrypting the device ID;
determining from the login request the account associated with the website using the user name;
in response to determining that the account is not associated with the device ID, requesting a password from the user for the account;
in response to validating that the password corresponds to the account, causing the user to be granted access to the website using the user name and the password of the account;
storing the device ID with the user name and the password for the account by the service provider;
receiving, from the mobile application of the user device, at least one subsequent login from at least one subsequent scan of at least one additional code displayed on the login page of the website using the camera of the user device with the device ID for the user device;
determining the website from the at least one additional code;
determining the account for the website using the device ID and the determining the website from the at least one additional code; and
communicating the user name and the password to the website for access to the account by the user during the at least one subsequent login, wherein the website transmits a login confirmation webpage to the user device to access to the account with the website.

2. The system of claim 1, wherein the code comprises a server URL for the website.

3. The system of claim 1, wherein the login request further comprises information encoded in the code.

4. The system of claim 1, wherein the one or more hardware processors are further configured to read instructions from the non-transitory memory to cause the system to perform operations comprising:
storing login credentials for accounts linked to the user device for a plurality of websites.

5. The system of claim 1, wherein the login request comprises login credentials of the user, and wherein the requesting the password from the user comprises accessing the password from the login credentials.

6. The system of claim 1, wherein the login request is received when the user scans the code after opening the mobile application on the user device.

7. The system of claim 1, wherein the code is a two-dimensional QR code.

8. A method comprising:
receiving by a processor of a server a login request from a user through a user device comprising at least a device identifier (ID) and a user name for an account, wherein the login request is received from a scan of a code on a login page of a website using a camera of the user device, wherein the user device executes a mobile application to scan the code using the camera, and wherein the mobile application captures and decodes the code to transmit the login request with the device ID encrypted by the mobile application;
decrypting the device ID;
determining from the login request the account associated with the website using the user name;
in response to determining that the account is not associated with the device ID, requesting a password from the user for the account;
in response to validating that the password corresponds to the account, granting access to the website using the user name and the password of the account;
storing the device ID with the user name and the password for the account by the service provider;
receiving, from the mobile application of the user device, at least one subsequent login from at least one subsequent scan of at least one additional code displayed on the login page of the website using the camera of the user device with the device ID for the user device;
determining the website from the at least one additional code;
determining the account for the website using the device ID and the determining the website from the at least one additional code; and
communicating the user name and the password to the website for access to the account by the user during the at least one subsequent login, wherein the website transmits a login confirmation webpage to the user device to access to the account with the website.

9. The method of claim 8, wherein the code comprises a server URL for the website.

10. The method of claim 8, wherein the login request further comprises information encoded in the code.

11. The method of claim 8, further comprising storing login credentials for accounts linked to the user device for a plurality of websites.

12. The method of claim 8, wherein the login request comprises login credentials of the user, and wherein the requesting the password from the user comprises accessing the password from the login credentials.

13. The method of claim 8, wherein the code is a two-dimensional QR code.

14. A non-transitory machine-readable medium having stored thereon machine-readable instructions executable to cause a machine to perform operations comprising:
receiving by a processor of a server a login request from a user through a user device comprising at least a device identifier (ID) and a user name for an account, wherein the login request is received from a scan of a code on a login page of a website using a camera of the user device, wherein the user device executes a mobile application to scan the code using the camera, and wherein the mobile application captures and decodes the code to transmit the login request with the device ID encrypted by the mobile application;
decrypting the device ID;
determining from the login request account associated with the website using the user name;
in response to determining that the account is not associated with the device ID, requesting a password from the user for the account;
in response to validating that the password corresponds to the account, granting access to the website using the user name and the password of the account;
storing the device ID with the user name and the password for the account by the service provider;
receiving, from the mobile application of the user device, at least one subsequent login from at least one subsequent scan of at least one additional code displayed on the login page of the website using the camera of the user device with the device ID for the user device;
determining the website from the at least one additional code;
determining the account for the website using the device ID and the determining the website from the at least one additional code; and
communicating the user name and the password to the website for access to the account by the user during the at least one subsequent login, wherein the website transmits a login confirmation webpage to the user device to access to the account with the website.

* * * * *